PBX IN-DIALING

Filed Oct. 21, 1966 3 Sheets-Sheet 1

INVENTORS R. W. KIRBY
P. C. RICHARDS
BY Howard R Popper
ATTORNEY

Nov. 18, 1969 R. W. KIRBY ET AL 3,479,467

PBX IN-DIALING

Filed Oct. 21, 1966 3 Sheets-Sheet 2

PBX IN-DIALING

United States Patent Office 3,479,467

Patented Nov. 18, 1969

3,479,467

PBX IN-DIALING

Ralph W. Kirby, South Burlington, Vt., and Philip C. Richards, Geneva, Ill., assignors to Bell Telephone Laboratories, Incorporated, Murray Hill, N.J., a corporation of New York Filed Oct. 21, 1966, Ser. No. 588,379
Int. Cl. H04m 3/00
U.S. Cl. 179—18 7 Claims

ABSTRACT OF THE DISCLOSURE

An arrangement is disclosed for providing direct in-dialing telephone service from a conventional, marker-controlled telephone office to the extensions of a PBX whose stations are served by a switch unit remote from the central office and controlled by a central control unit located in the central office. A circuit is provided at the central office which is called into operation on calls directed to such stations to associate the control unit instead of the conventional number group translator with central office marker to furnish the marker the identity of an idle trunk to the switch unit. Simultaneously, the control unit instructs the remote switch unit to establish a connection between the idle trunk and the station corresponding to the called number digits. In this manner the called number digits need not first be outpulsed to the switch unit by the central office and then returned to the control unit for translation.

This invention relates to telephone switching systems and more particularly to the furnishing of inward dialing service to the extension stations of private branch exchanges.

A private branch exchange is a facility which permits both local calls among stations having a community of interest as well as trunk calls through the central office. In recent years direct inward dialing service has become available. In this type of service, calls from the central office to the stations of the private branch exchange may be automatically switched through without the need of involving the PBX operator in the call. Heretofore direct inward dialing service has been achieved by causing the central office to transmit the called extension station number over a trunk incoming to the PBX to operate the PBX's inward switching train. Because central office PBX trunks, unlike most other trunks, appear in the central office on the line side of the switching network the modifications described in Burns et al. Patent 3,264,415 were required to permit the central office to outpulse the called number digits on the line side of the switching network. These modifications included the provision of a special line circuit for the central office PBX trunk which had link access to a dial pulse sender in somewhat similar fashion to that in which outgoing trunks are given link access to outgoing senders.

While the foregoing arrangement has been quite satisfactory in furnishing direct inward dialing service to conventional private branch exchanges, some shortcomings have been noted in employing this procedure to provide direct inward dialing service to the new electronic private branch exchanges which employ a plurality of remote switch units administered by a centralized control unit located at the central office. An electronic private branch exchange of this type is described in Gebhardt et al. Patent 3,225,144 issued Dec. 21, 1965. The remote switch units of this type of electronic private branch exchange equipment establish a plurality of simultaneous telephone connections under the control of the control unit which writes into the local memory at each switch unit the instructions needed to close that unit's time division switches. The information required to be stored in each switch unit's memory is received from the control unit over a respective data link. The data link for each switch unit is also employed to transmit changes in the supervisory states of the lines, trunks, and attendant keys as detected by a local scanner at the switch unit. When a station at one of the remote switch units dials or keys digits, the dialing or keying condition is detected and an order is transmitted from the central office control unit over the data link to the switch unit to establish a time division connection between the calling extension station and a digit trunk which runs between the switch unit and the control unit. The digit trunk has access to a digit receiver at the control unit which receives the called number and furnishes it to the call processing equipment. The called number digits are translated by the call processor equipment and orders are transmitted back to the switch unit over the data link to instruct the switch unit to establish the appropriate connections. If the call is an intra-switch unit call, a time division connetcion is made between the calling and called stations via their appearances on the two different time division buses at the switch unit. If the call is outgoing from the switch unit, the information transmitted to the switch unit will contain an instruction to seize an idle central office trunk appearing on the time division bus and establish a time division connection between the calling subscriber and the central office trunk.

While the operation so far described is extremely efficient, the handling of an incoming call is not quite so efficient because the called number pulsed from the central office over the trunk to the remote switch unit cannot be translated at the switch unit but must be continued via a time division connection from the central office trunk to a digit trunk at the switch unit and then returned over the digit trunk to the digit receiver located in the control unit. This procedure resulted in the called number having to travel the distance out to the switch unit and then back to the control unit. In addition, the need to make a speech trunk to digit trunk connection at the switch unit reduced the number of digit trunks available to the subscribers at the switch unit who might desire to use one of the trunks for dialing. It was also possible in this prior arrangement for the control unit to seize a trunk for use on an outgoing call from the switch unit at the same time that the central office seized the same trunk to route an incoming call to the switch unit. This double seizure possibility resulted in some impairment of telephone service.

Accordingly, it is an object of the present invention to improve private branch exchange service and more particularly to improve direct inward dialing service to private branch exchanges.

The improvement in in-dialing service to be accorded to stations of remote switch units "homing on" a control unit located in the telephone central office is achieved by modifying the manner in which the central office accomplishes the called number translation. The central office selected for illustration is an office employing the No. 5 Crossbar apparatus of the type disclosed in A. J. Busch 2,585,904, issued Feb. 19, 1952. This type of central office employs a marker which controls the establishment of cross-office linkages between line link and trunk link frames. To obtain the line link frame equipment location corresponding to a called directory number, the marker conventionally obtains access to a number group translator. However, when the call is being made to a PBX, the number group, as an incident to providing the foregoing, extended sleeve leads to the marker from each of the PBX trunks serving the called PBX. The marker tested the sleeve leads, and, together with the remainder of the information provided by the number group, obtained the equipment location of an idle trunk to the PBX.

The use of the conventional number group, even when it was to furnish the equipment locations of central office PBX trunks equipped for line link pulsing so as to handle direct inward dialing calls, involved certain disadvantages. On each seizure by the marker the number group is capable of extending only ten PBX trunk sleeve leads to the marker for testing. If none of these trunks are available for use, the marker must recycle its terminal hunting equipment to test the sleeves of an additional set of ten trunks serving the desired PBX. The need to resort to terminal hunting recycle introduces an undesirable delay into the system as well as adding to marker usage time. Moreover, the foregoing somewhat cumbersome arrangement required an office equipped for line link pulsing. If no such office was available in the immediate vicinity of the PBX, the PBX trunk lines would have to be extended to a possibly more remote office which was equipped for this function. It is apparent therefore that the elimination of the need to adapt each PBX trunk for line link pulsing would achieve a considerable economy in central office installation and at the same time speed up the handling of direct inward dialing calls.

In accordance with the illustrative embodiment of the invention, direct inward dialing srevice to stations of remote switch units homing on a control unit located in the central office is achieved by providing a central office interface unit which permits the central office marker to communicate with the PBX control unit. The marker furnishes the called directory number to the control unit. The control unit, independently of the marker, translates the directory number and ascertains the central office equipment location of an idle trunk serving the corresponding switch unit. The control unit then transmits to that switch unit, over the appropriate data link, the identity of the trunk so selected as well as the identity of the station corresponding to the called directory number. The control unit also informs the marker of the equipment location of the selected trunk and the marker establishes a cross-office connection to that trunk without performing any trunk hunting or other functions priorly required when establishing connections to PBX trunks. Because the control unit maintains a record of available PBX trunks and is responsible for selecting trunks both on calls originated at the remote switch unit as well as for calls incoming to switch units, there is no possibility of a PBX trunk being simultaneously seized for both purposes.

The foregong and other objects and features may become more apparent by referring to the drawing in which.

Figure 1:
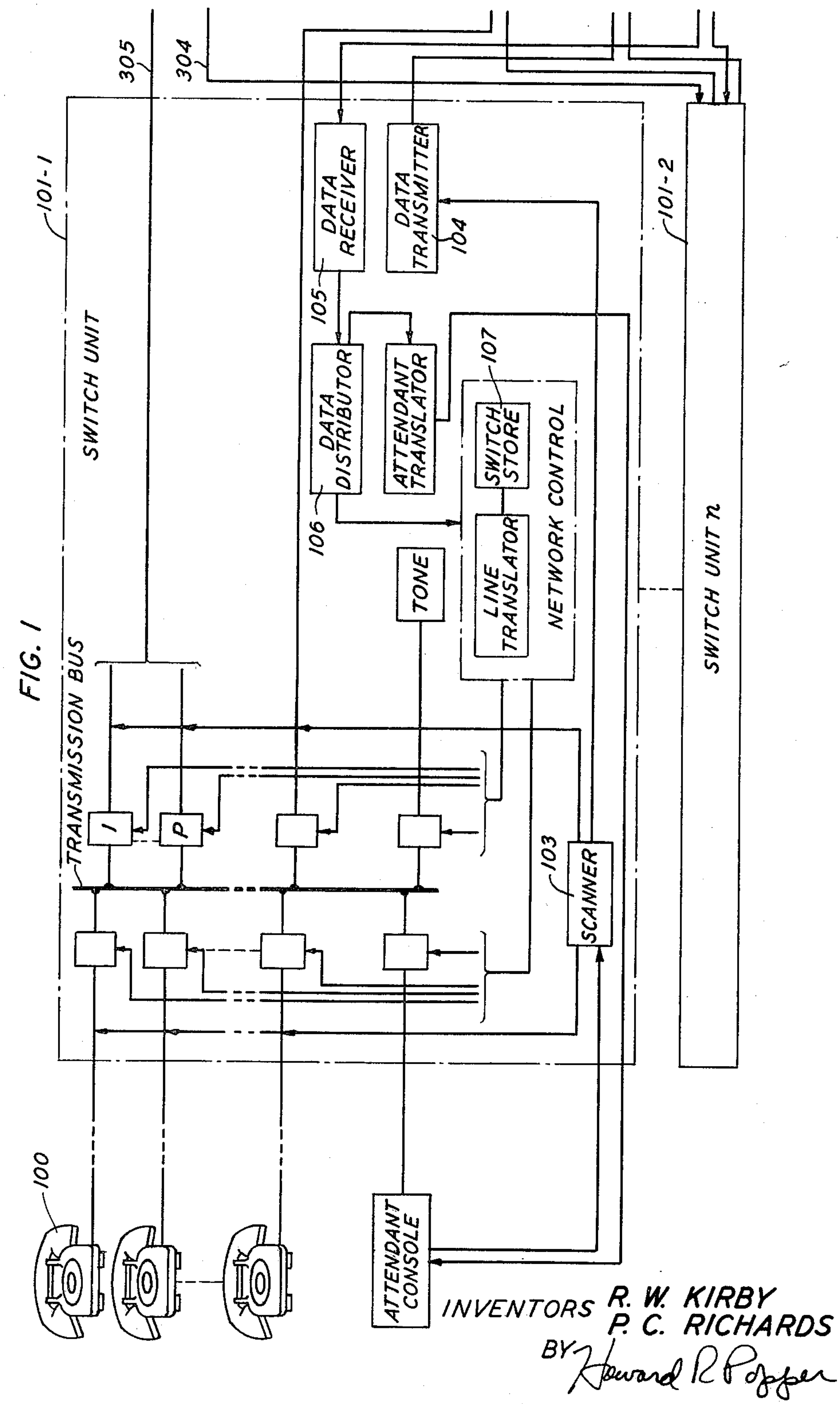
FIG. 1 shows a plurality of remote switch units.

The manner in which the present invention simplifies the handling of direct inward dialed calls to stations at remote switch units may perhaps be best understood after considering the manner in which direct inward dialed calls have heretofore been completed. When the marker 301, FIG. 3, receives the directory number of the called telephone (originally transmitted to the central office over calling trunk 300 appearing on trunk link frame TLF) the thousands digit enables the marker to select a number group 303 by operating a corresponding number group connector 302–1. The marker passes to the selected number group over parallel leads the hundreds, tens, and units digits of the called directory number. In the number group, as described, for example, in Busch Patent 2,585,904 issued Feb. 19, 1952, hundreds block, tens block, and units digit relays are operated by this information to select a set of directory number code points corresponding to the called directory number. There are three code points (not shown) for each directory number and separate jumpers are run from each code point through translation fields to provide the equipment location and ringing combination associated with the called number.

If the called number is at a private branch exchange, there normally will be a plurality of trunks such as trunk 304 between the central office and the private branch exchange. In this case, besides the tens block relay of the number group there will be operated, in parallel, an SC (sleeve connect) relay, not shown in the drawing, whose contact springs have access up to ten of the trunks serving the PBX. When the SC relay is operated, these sleeve leads are extended through the number group to the marker. The number group furnishes the marker a silent ringing combination also indicating a terminal hunting group. Upon receipt of this indication, the marker tests the ten sleeve leads and transmits a units code for the first idle trunk found. Where there are more than ten trunks in a PBX group, SC relays will be associated with all the tens block relays that have trunks of that group, and the marker may advance from one to another if all trunks associated with one tens block relay are busy. The marker, upon obtaining the location of an idle PBX trunk, such as trunk 304, places the trunk in the "off-hook" condition.

It will be observed that thus far central office operation has proceeded without regard to conditions at the PBX. Accordingly, it may happen that the PBX is attempting to seize the same trunk 304 for use on a trunk call at the same time that the central office marker determined the trunk to be available for its use. Under these circumstances a "glare" condition may result in which the trunk is unavailable for use from either end.

Figure 2:
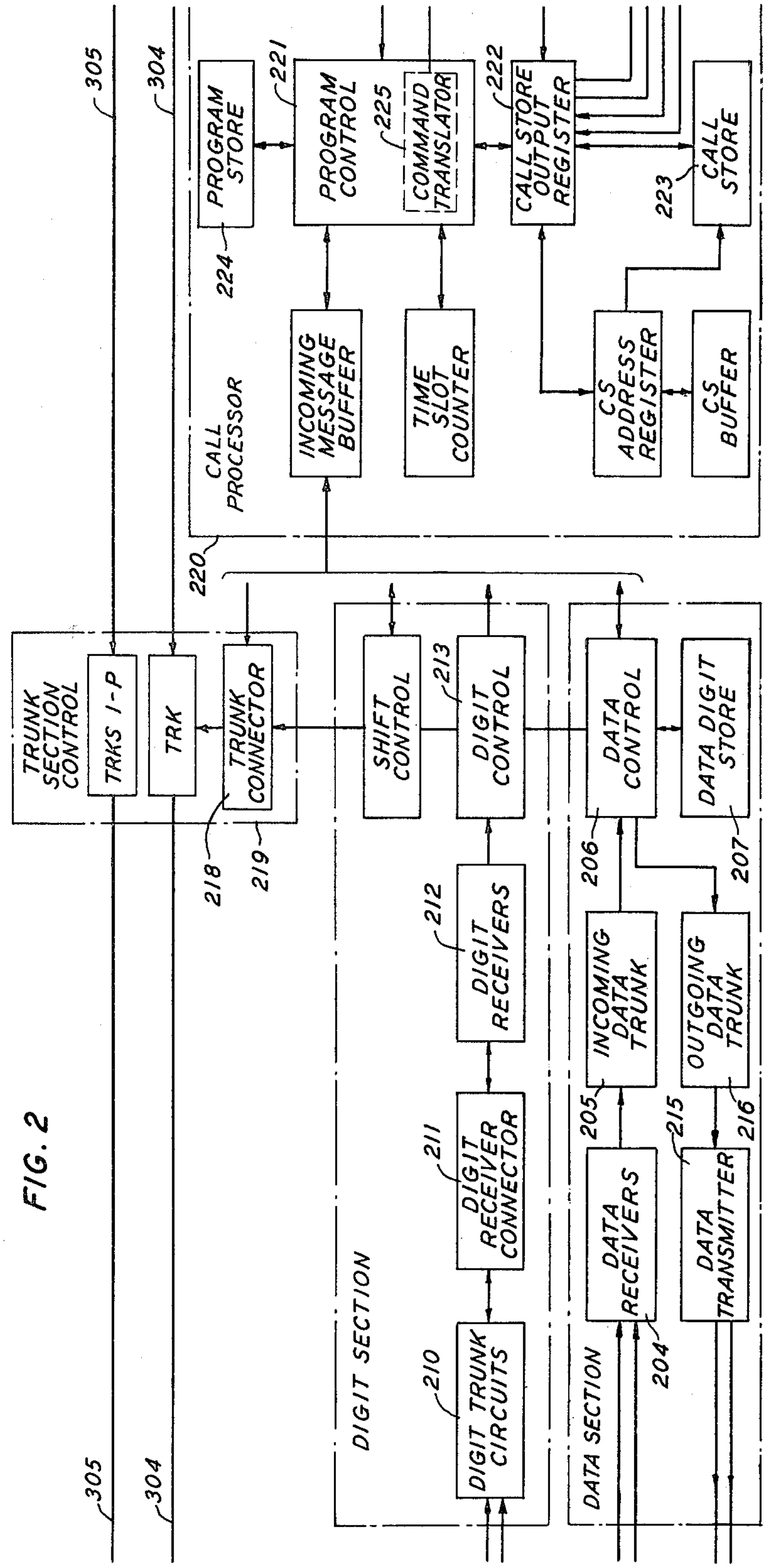
FIG. 2 shows a portion of the control unit.
Figure 3:
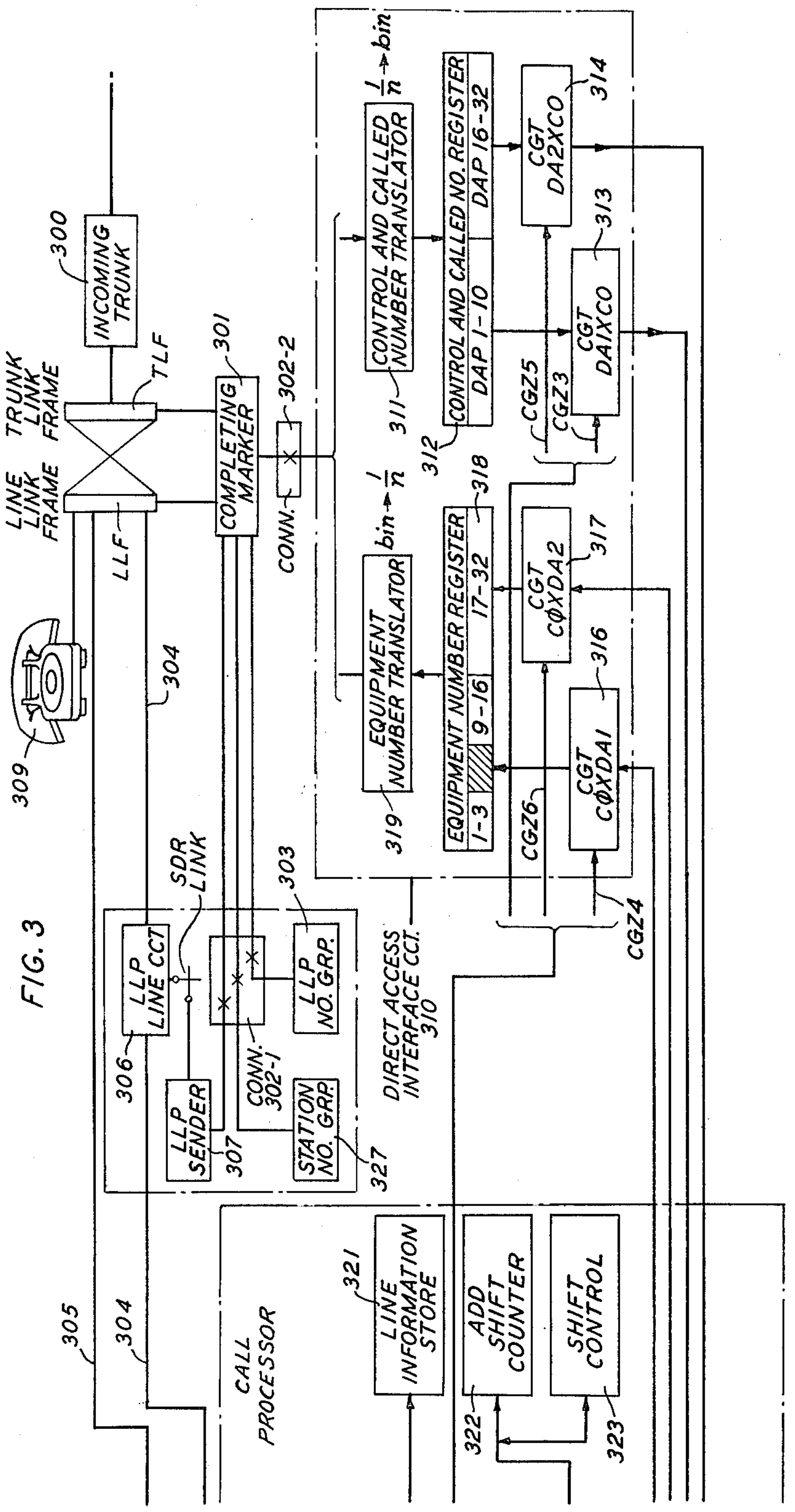
FIG. 3 shows the remainder of the control unit together with the marker controlled central office switching network, illustrative of one specific embodiment of our invention, the figures being placed side by side in an obvious way.

With the trunk seized at the central office, outpulsing of the called number to the PBX could proceed if the PBX to which the trunk is connected were of the conventional step by step type. However, the electronic PBX disclosed in Patent 3,225,144 provides a switch unit 101–2 for example, FIG. 1, at the remote end of the trunk which does not operate autonomously. Outpulsing is therefore not permitted until the switch unit scanner 103 detects the off-hook condition of trunk 304 and so informs the control unit, FIG. 2. Although trunk 304 is connected to switch unit 101–2, the following description will refer for simplicity of drawing only to the corresponding internal elements shown in detail for switch unit 101–1, it being understood that such elements are also present in switch unit 101–2. The switch unit 101–2 must then be instructed to establish a connection from trunk 304 to one of digit trunks 210. The manner in which this takes place is as follows: The switch unit scanner 103 first detects the off-hook condition of PBX trunk 304 and temporarily halts its scanning. Scanner 103 sends the off-hook condition and the number of the PBX trunk at switch unit 101–1 to data transmitter 104. Data transmitter 104 sends this message to the data receiver 204 at the control unit, FIG. 2. Upon request of call processor 220, the message is passed from the data and digit store 207 to the call processor. Upon receiving the trunk origination, call processor 220 chooses an idle time slot, an idle one of digit trunks 210 and of digit receivers 212. The digit trunk number, PBX trunk equipment location, time slot number, and a scanner start signal are passed to the data and digit store 207 for transmission to the switch unit. The data transmitter 215 at the control unit transmits this message to the data receiver 105 at the switch unit. The data receiver 105 passes the incoming message to the data distributor 106. The data distributor 106 writes the PBX trunk's equipment number and the digit trunk number into the proper time slot in the switch store 107, thus connecting PBX trunk 304 to one of digit trunks 210 over the transmission bus. The data distributor 106 also passes a scanner restart signal to scanner 103. The call processor 220 writes the digit trunk number and the digit receiver number into the chosen time slot in the digit receiver connector 211 connecting the selected digit trunk and digit receiver. The connection that now exists extends from the PBX trunk at the line link frame LLF (FIG. 3) of the central office to the remote switch unit 101–1, over the transmission bus thereat and back to one of digit receivers 212 in the control unit. The call processor 220 may now send a start signal through the trunk connector 218 of the trunk control section 219 back over the PBX trunk to line circuit 306 (FIG. 3). In accordance with the procedures disclosed in Burns et al. Patent 3,264,415, issued Aug. 2, 1966, a line link pulsing sender circuit 307 associated with line circuit 306 of PBX trunk 304 will have been furnished the station digits of the called station's directory number and, responsive to the start signal, will commence outpulsing the digits serially. The digits so outpulsed are received at the switch unit, forwarded over the transmission bus to digit trunk 210, and entered into digit receiver 212 at the control unit. Digit control 213 samples the output of the digit receiver 212 and directs that the dialed digits are to be placed in that portion of data and digit store 207 associated with the digit receiver used. Upon request of the call processor 220, the digits and the digit receiver number are passed forward from the data and digit store to the call processor. Call processor 220 then translates the dialed digits to obtain the switch unit equipment location of the called station so that ringing may be applied thereto and, eventually, a talking connection established.

In this prior art method of providing direct inward dialing to a called station at the switch unit it will be observed that the control unit could not translate the directory number of the called station into its switch unit equipment number and could not establish a connection to the called station at the switch unit until the called station's directory number was outpulsed to the switch unit and then back over a digit trunk to the control unit. Not only is this a time-consuming and circuitous procedure but it is also wasteful of digit trunk capacity, cutting down on the number of simultaneous calls capable of being originated by stations at the switch unit. In addition, since the marker conducts the selection of PBX trunks independently of the switch unit, it is possible for a PBX trunk simultaneously to be seized by the marker for a call incoming to a station at the switch unit at the same time that the control unit is seizing the same trunk for a different call originated by another station at the switch unit.

In accordance with the principles of the illustrative embodiment, the directory number information furnished marker 301 is employed by the marker to operate connector 302–2 instead of connector 302–1 whenever the marker determines from the directory number that a call is incoming over trunk 300 destined for a station at one of the remote switch units 101–1, 102–2 (FIG. 1). This determination is accomplished from the office code and thousands digit and merely requires that the thousand telephone numbers designated by the thousands digit be dedicated for assignment only to switch unit telephones. In accordance with an aspect of our invention, direct inward dialing to the remote switch units is obtained without modification of the central office operations since marker 301 treats the direct access interface circuit 310 in the same manner as a standard number group translator 327, the one being accessible by connector 302–2 and the other by connector 302–1.

Let it be assumed that the call is for station 100 at switch unit 101–1. When connector 302–2 is operated, parallel leads are extended from marker 301 to direct access interface circuit 310. The thousands, hundreds, tens, and units digits of the called directory number registered in completing marker 301 are passed to control and called number translator 311. These four digits of the called directory number are converted in translator 311 from one-out-of-*n* form to the binary form employed by call processor 220. Translator 311 advantageously also includes checking circuits to insure that one, and one only, of each of the one-out-of-*n* coded called number designations sent by the marker is received at the interface circuit. An even-odd parity bit is also provided by translator 311 in well-known manner.

In addition to the digits of the called number, the marker furnishes interface circuit 310 with an origination mark which indicates whether the call is from an incoming trunk, an operator toll position, or a test facility. When all of the information has been translated and checked, the information is entered in register 312. Register 312 includes a plurality of binary gates which make the informtaion available to be entered into call store output register 222 when called for by command translator 225.

Two gates 313 and 314, respectively enabled by gating command translator 225 outputs CGZ3 and CGZ5, are provided to pass the information stored in register 312 to call store output register 222. During the CGZ3 command, the information contatining the results of the one-out-of-*n* check, the parity information and the origination mark are accepted by register 222. After accumulating this information, the processing program being executed will instruct command translator 225 to furnish the CGZ5 command. This command causes the binary-coded called number to be accepted by register 222. The parity of the called number is compared with that previously registered during the execution of the CGZ3 command. Let it be assumed that the parity checks properly. From the called number information, program control, by consulting with program store 224, will determine at which switch unit the called station is located. After this is determined an idle one of central office trunks 305 that serves the called switch unit is selected. The identity of this trunk and that of the called station number is entered into call store 223.

Each such central office trunk also has its equipment location number, which identifies its appearance in central office line link frame LLF (FIG. 3), associated with it in program store 224. When this trunk is selected to service the called station, the central office line link frame equipment location number is obtained from program store 224 and entered in call store output register 222 for transmission to interface circuit 310. Command translator 225 is instructed by the call processing program to furnish the CGZ4 command. This command activates gate 316 and causes the vertical and horizontal group information part of the central office trunk's equipment location to be accepted by register 318. The call processing program then instructs the command translator to furnish the CGZ6 command. On this command gate 317 is activated and the frame units, frame tens and vertical file information part of the central office trunk's equipment location, as well as the ringing combination associated therewith, is accepted by register 318. The binary information so registered is applied to translator 319 for conversion from binary form to the one-out-of-*n* form acceptable to marker 301.

When marker 301 receives the equipment location and ringing combination information pertaining to the selected one of trunks 305, it completes a cross-office linkage thereto from incoming trunk 300 in the normal manner. Marker 301 is not given any trunk hunting information and so the cross-office connection may be made in the same manner as would be appropriate for completing an incoming call to an ordinary telephone set 309. The sole exception is in the ringing combination employed, i.e., silent ringing. When the cross-office connection is established, the switch unit end of the selected trunk exhibits an off-hook condition.

At the same time as the foregoing, switch unit scanner 103 is routinely scanning lines and trunks at the switch unit and furnishing data transmitter 104 with scan point messages for the control unit. When the central office has seized the selected one of trunk circuits 305 in accordance with the above description, this condition will be detected by scanner 103 and a corresponding scan point message will be forwarded to the control unit. The control unit will read from call store 223 the progress mark associated with the scan point message which corresponds to the selected trunk and determine therefrom that this trunk has been appropriately seized by the central office. Call store 223 is then checked to determine if the called station is busy.

Assuming the called station to be idle, the time slot number, the called station's equipment number, the number of the selected central office trunk, and a ringing instruction are passed to data and digit store 207 for transmission to the switch unit. Data transmitter 215 transmits this message to data receiver 105 at the switch unit where it is passed to data distributor 106. Data distributor 106 writes the called station's equipment number, the number of the central office trunk, and the ringing instruction into the switch store 107. Ringing is applied at the switch unit and when the called station goes off-hook, ringing is tripped at the line circuit. The scanner 103 detects the off-hook condition of the called station and passes this information together with the called station's equipment number to the data transmitter 104 for transmission to the control unit. The data receiver 204 at the control unit passes the message to the data and digit store 207 which then forwards the information to the call processor 220 when requested. The call processor 220 compares the message to existing records in the call store 223 and identifies the message with the call being set up. The scanner start signal, the called station's equipment number, the number of the contral office trunk, and the time slot number are passed to the data and digit store 207 for transmission back to the switch unit. The data and digit store 207 sends the message to the data distributor 106 at the switch unit which restarts the scanner 103, and writes the called station's equipment number and the trunk number into the switch store 107. A communications connection is now established between the central office trunk and the called station. The call processor 220 then may send an off-hook signal through the trunk connector 218 to the selected one of trunk circuits 305 which indicates to the central office that the call has been answered.

From the foregoing, it will be seen that by the use of direct access interface circuit 310, the line link pulsing line circuit 306, line link pulsing sender 307, line link pulsing number group 303, and connector 302–1 may completely be eliminated. Elimination of this equipment not only permits the comparatively simpler registers, gates, and binary translator equipments of direct access interface circuit 310 to be employed instead, but also materially speeds up call completion. With the use of direct access interface circuit 310, central office 4BX trunks will no longer encounter double seizure problems since all such trunks are assigned by call processor 220. The transmission of called number information is made directly in the central office from the marker 301 through interface circuit 310 to call processor 220 instead of by the former circuitous route by way of the switch unit. It should however be noted that the use of the direct access interface circuit 310 is entirely compatible with the continued use, side by side in the same central office, of the apparatus 302–1, 303, 306, and 307 for line link pulsing to certain switch units such as 101–2.

It will be apparent to those skilled in the art that certain modifications may be made in the system as described herein. However, it is to be understood that the above descriptive arrangements are merely illustrative of the principles of the invention and that other arrangements may be devised by those skilled in the art without departing from the spirit and scope of this invention.

What is claimed is:

1. A telephone switching system comprising a central office having a marker-controlled switching network, a plurality of telephone stations at a remote switch unit, a plurality of trunks connecting said switch unit with said central office switching network, a stored program control unit for exchanging control information with said switch unit to establish communications connections among said stations and trunks thereat, and translator means including said control unit for furnishing the marker of said central office switching network with the central office equipment location of an idle one of said trunks serving called telephones at said switch unit.

2. A telephone switching system according to claim 1 further including interface circuit means, said stored program control unit and said marker of said central office switching network being connected with said interface circuit means.

3. A telephone switching system according to claim 2 wherein said stored program control unit includes command translator means and wherein said interface circuit includes gating means operable under control of said command translator means.

4. A telephone switching system according to claim 3 wherein said interface circuit includes means for receiving called telephone numbers from said marker of said switching network, means for translating said numbers into a code form acceptable to said stored program control unit, means for receiving said equipment location of said idle one of said trucks from said control unit and means for translating said equipment location into a code form acceptable to said marker.

5. A telephone switching system according to claim 4 wherein said means for receiving includes means for checking that said called telephone numbers received from said marker are in said form acceptable to said stored program control unit and wherein said gating means includes a first gate controlled by said command translator for transferring said called telephone numbers translated by said translating means to said stored program control and a second gate controlled by said command translator for transferring said called telephone numbers to said stored program control.

6. In a telephone switching system a plurality of remote switch units, a central office including an electronic control unit for said switch units, data transmission means between said electronic control unit and each of said switch units, a first and a second plurality of trunks connected to said central office, said central office further comprising number group translation means for identifying one of said trunks in said central office to which said central office is to establish a connection, marker means, means controlled by said marker means for obtaining from said number group translation means trunk identifications of said first plurality of trunks, and means controlled by said marker means for obtaining trunk identifications of said second plurality of trunks from said electronic control unit, said control unit thereupon controlling one of said switch units over said data transmission means to establish a connection to one of said second plurality of trunks at said switch unit and said marker controlling the establishment of a connection to said one of said trunks at said central office.

7. A telephone central office having a marker controlled switching network, a plurality of telephone stations at each of a plurality of remote switch units, a plurality of trunks connecting said switch units with said central office switching network, a stored program control unit for exchanging control information with said switch unit to establish communications connections among said stations and trunks thereat, means for connecting the marker of said switching network with said control unit when said switching network is processing a call incoming for one of said stations at one of said switch units, said connecting means including means for receiving from said marker the directory number of the called one of said stations, means for furnishing said directory number to said control unit, means for receiving from said control unit the central office equipment location of an idle one of said trunks serving the switch unit having said called one of said stations, and means for furnishing said equipment location to said marker, means at said remote switch unit for determining when said marker has seized said idle one of said trunks responsive to said furnishing of said equipment location, and means at said control unit for instructing said switch unit to interconnect said one of said trunks with said called one of said stations.

No reference cited.

KATHLEEN H. CLAFFY, Primary Examiner

T. W. BROWN, Assistant Examiner

UNITED STATES PATENT OFFICE

Certificate

Patent No. 3,479,467 Patented November 18, 1969

Ralph W. Kirby and Philip C. Richards

Application having been made by Ralph W. Kirby and Philip C. Richards, the inventors named in the patent above identified, and Bell Telephone Laboratories, Incorporated, Murray Hill, N.J., a corporation of New York, the assignee, for the issuance of a certificate under the provisions of Title 35, Section 256, of the United States Code, deleting the name of Ralph W. Kirby as a joint inventor, and a showing and proof of facts satisfying the requirements of the said section having been submitted, it is this 11th day of April 1972, certified that the name of the said Ralph W. Kirby is hereby deleted from the said patent as a joint inventor with the said Philip C. Richards.

FRED W. SHERLING
*Associate Solicitor.*